Aug. 18, 1959  W. H. MORSE  2,900,537
QUIET SQUIRREL-CAGE MOTORS
Filed April 5, 1957
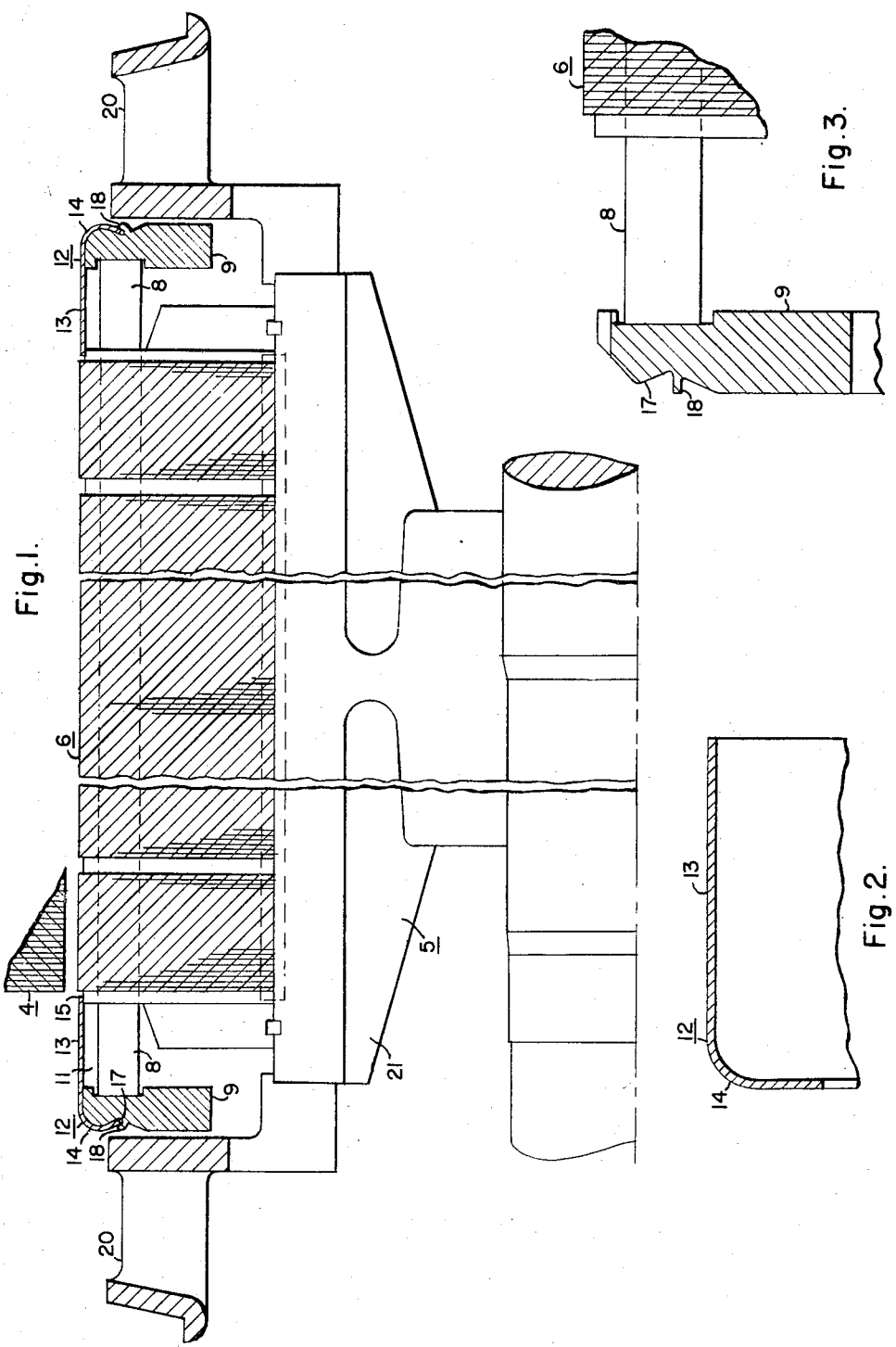

United States Patent Office 2,900,537
Patented Aug. 18, 1959

2,900,537

QUIET SQUIRREL-CAGE MOTORS

William H. Morse, Penn Township, Allegheny County, Pa., assignor to Westinghouse Electric Corporation, East Pittsburgh, Pa., a corporation of Pennsylvania Application April 5, 1957, Serial No. 650,985

4 Claims. (Cl. 310—51)

My invention relates to an inexpensive means for overcoming most of the objectionable noise of a squirrel-cage motor, which is a noise having a frequency depending upon the number of damper-bars or rotor conductors and the speed of rotation of the motor. The invention relates to an inexpensive means for covering the exposed ends of the damper-bars, which is less expensive than the use of banding wire, stainless-steel shrink-rings, and other expedients which have heretofore been used.

According to my invention, I preferably make the two noise-baffling shields, which cover the respective ends of the squirrel-cage winding of the motor, out of flat annular blanks of thin sheet-aluminum, which are spun into cylinders having integral, radially disposed flanges which are adapted to extend down around the ends of their associated resistance-rings at the ends of the squirrel-cage winding. It is necessary for the shield to be of non-magnetic material, which is the reason why stainless-steel was chosen for the material of the previously used shrink-rings. However, the cost of a noise-baffling shield made of a thin piece of sheet-aluminum shaped as described above is much less than that of any previously known way of covering the exposed ends of the damper-bars, while such a shield is highly effective in substantially eliminating noise. The provision of an inexpensive means for preventing noise is of considerable commercial importance, since the noise produced by conventional squirrel-cage motors is very objectionable to many users of such motors, and the elimination of such noise without substantially increasing the cost of the motor is an important advance in the art.

A preferred form of embodiment of my invention is shown in the accompanying drawing, and its nature and advantages will be set forth in the following description and defined in the claims.

In the drawing:

Figure 1 is a longitudinal sectional view of an illustrative form of embodiment of my substantially noiseless squirrel-cage motor, with nearly all of the stator member broken away, and with the bottom half of the rotor member omitted;

Fig. 2 is a longitudinal sectional view of one of the spun baffles, ready for assembly; and Fig. 3 is a detail of one end of the squirrel-cage winding, showing its condition prior to the assembly of the noise-baffling shield.

Fig. 1 shows a squirrel-cage motor having a fragmentarily illustrated stator member 4, and a rotor member 5, the top half of which is shown in some detail. The rotor member includes a slotted, laminated rotor-core 6, which carries a squirrel-cage winding which consists of a plurality of damper-bars 8 which are disposed within the slots of the rotor-core, and which extend out beyond the ends of the rotor-core; and two machined resistance-rings 9 which are joined to the ends of the damper-bars, at the respective ends of the squirrel-cage winding. Between each resistance-ring 9 and the associated end of the rotor-core 6, there is, of necessity, a certain space 11, where the exposure of the damper-bars to the air has heretofore been the source of most of the objectionable noise.

According to my invention, I provide an improved noise-baffling shield 12, as shown in Fig. 1, for spanning each of the spaces 11 between the damper-bars 8 and the adjacent ends of the rotor-core 6. Each shield 12 is composed of a thin sheet-like non-magnetic material, preferably a thin sheet of aluminum. The most economical way of providing this shield is by spinning, so as to provide a cylindrical formation, as shown at 13 in Fig. 2, which has an integral radially disposed flange 14. In the broader aspects of the invention, it may be possible to find some other means for providing a shield which is composed of a thin sheet-like non-magnetic material having a substantially cylindrical portion 13 and an integrally formed, substantially radially disposed flange 14, although the spun-aluminum construction is the lowest-cost construction which I have so far found.

The cylindrical portion 13 of each shield 12 extends peripherally over or around its associated resistance-ring 9, and it extends axially across the associated space 11, to the adjacent end of the rotor-core 6, where it preferably makes a light contact with a slightly depressed shoulder 15 at the end of the rotor-core 6. The radial flange 14 extends down around the end of its associated resistance-ring 9.

The damper-bars 8 are of relatively great radial depth, which is many times the thickness of the sheet-material of the shields 12. Furthermore, the ends of these damper-bars are securely joined to the respective resistance-rings 9, which are still more massive than the bars. Hence, the extending ends of the squirrel-cage winding, which extend beyond the ends of the rotor-core 6, have a considerably greater mechanical strength to resist centrifugal forces, than their associated shields 12. My shields are thereby distinguishable from the banding-wires and from the stainless-steel shrink-rings of the prior art, both of which applied a radial compression or binding-force against the exposed ends of the damper-bars 8, which not only assisted these damper-bar ends, to some extent, in resisting the centrifugal forces due to the rotation of the rotor-member 5, but also provided a frictional force to prevent the bar-covering means from slipping off in an axial direction. In accordance with my invention, the cylindrical portion 13 of each shield 12 is out of firm contact with the damper-bars 8.

Some suitable means must be provided for securing the flange 14 of each of the shields 12 to its associated resistance-ring 9. A preferred means for this purpose is illustrated, which has the advantage of very low cost. Actually, this is a double securing-means. Thus, as shown in Fig. 1, the bottom or radially inner edge of the flange 14 is spun or rolled, or otherwise deformed, radially inwardly around and into a groove or depressed portion in the end of the associated resistance-ring 9, as shown at 17. Then I secure each shield 12 against axial displacement, that is, against slipping off of the rotor-member in an axial direction, by rolling or spinning a thin lip 18 of the machined resistance-ring 9 over the bottom edge of its associated flange 14, as shown in Fig. 1. The condition of the shield 12, prior to this final groove-engaging spinning or rolling operation, for securing the shield, is shown in Fig. 2; while the condition of the resistance-ring 9, prior to these same shield-securing operations, is shown in Fig. 3.

In the particular squirrel-cage motor to which my invention is applied in Fig. 1, I have provided a blower 20 at each end of the rotor-member, this blower being secured to the rotor-spider 21 in any suitable manner.

A low cost baffle or shield is thus provided which covers the ends of the damper bars and substantially eliminates the objectionable noise caused by the exposed ends of the bars in the absence of such a shield. A preferred embodiment of the invention has been shown for the purpose of illustration, but it will be understood that, in its broader aspects, the invention is not limited to the specific details of construction shown but includes all equivalent modifications and embodiments.

I claim as my invention:

1. A squirrel-cage motor having a rotor-core, damper-bars carried by the rotor-core and extending out beyond the ends of the rotor-core, resistance-rings joined to the ends of the damper-bars, there being a space between each resistance-ring and the adjacent end of the rotor-core, a noise-baffling shield spanning each of said spaces, each shield being composed of a thin sheet of aluminum having a substantially cylindrical portion extending peripherally over its associated resistance-ring and extending axially across to the adjacent end of the rotor-core, each shield further having an integral-substantially radially disposed flange which extends down around the end of its associated resistance-ring, and a means for securing each of said flanges to its associated resistance-ring; the flange of each shield having an inwardly disposed portion, which extends into a depressed portion in the end of the associated resistance-ring.

2. A squirrel-cage motor having a rotor-core, damper-bars carried by the rotor-core and extending out beyond the ends of the rotor-core, resistance-rings joined to the ends of the damper-bars, there being a space between each resistance-ring and the adjacent end of the rotor-core, a noise-baffling shield spanning each of said spaces, each shield being composed of a thin sheet of aluminum having a substantially cylindrical portion extending peripherally over its associated resistance-ring and extending axially across to the adjacent end of the rotor-core, each shield further having an integral-substantially radially disposed flange which extends down around the end of its associated resistance-ring, and a means for securing each of said flanges to its associated resistance-ring; the flange of each shield having an inwardly disposed portion, which extends into a depressed portion in the end of the associated resistance-ring; and each resistance-ring having a deformable portion which locks said inwardly disposed portion in place against axial displacement.

3. A squirrel-cage motor having a rotor-core, damper-bars carried by the rotor-core and extending out beyond the ends of the rotor-core, resistance-rings joined to the ends of the damper-bars, there being a space between each resistance-ring and the adjacent end of the rotor-core, and a noise-baffling shield spanning each of said spaces, each shield being composed of a thin sheet-like non-magnetic material having a substantially cylindrical portion extending peripherally over its associated resistance-ring and extending axially across to the adjacent end of the rotor-core, the sheet-like material of each shield further having an integral, substantially radially disposed flange which extends down around the end of its associated resistance-ring; each resistance-ring having a deformable portion which locks the flange of its associated shield in place against axial displacement.

4. A dynamoelectric machine having a rotor member including a rotor core, a plurality of conducting bars carried by the rotor core and extending beyond the ends of the rotor core, resistance rings joined to the ends of the conductor bars, said resistance rings being spaced from the adjacent ends of the rotor core, and a noise baffling shield at each end of the rotor, each of said shields being made of thin, non-magnetic sheet material, each shield having a generally cylindrical portion extending axially over the resistance ring and conductor bars to the adjacent end of the rotor core and having a generally radial flange portion extending over the resistance ring, the flange portion engaging in a groove in the resistance-ring and the resistance-ring having a lip extending over the flange portion to retain the shield in position.

References Cited in the file of this patent

UNITED STATES PATENTS

| | | |
|---|---|---|
| 1,761,587 | Ringland | June 3, 1930 |
| 2,590,255 | LeTourneau | Mar. 25, 1952 |
| 2,683,233 | Ruhl | July 6, 1954 |

FOREIGN PATENTS

| | | |
|---|---|---|
| 56,443 | Switzerland | Apr. 8, 1924 |